(No Model.)

G. C. PHILLIPS.
Sectional Steam Packing.

No. 235,894. Patented Dec. 28, 1880.

Witnesses:

Inventor:
George C. Phillips
by his Attys.

UNITED STATES PATENT OFFICE.

GEORGE C. PHILLIPS, OF SILVER CITY, NEVADA.

SECTIONAL STEAM-PACKING.

SPECIFICATION forming part of Letters Patent No. 235,894, dated December 28, 1880.

Application filed May 22, 1880. (No model.)

*To all whom it may concern:*

Be it known that I, GEORGE C. PHILLIPS, of Silver City, Lyon county, State of Nevada, have invented certain new and useful Improvements in Sectional Steam-Packing; and I do hereby declare that the following is a full, clear, and exact description thereof, reference being had to the accompanying drawings.

My invention is an improvement on sectional steam-packing for which Letters Patent were granted to me on the 25th day of November, 1879. Its object is to effect a better and more complete lubrication of the piston-rod, to prevent heating and fusion of the inner portions of the packing-rings where they bear against the piston-rod, and to produce, generally, a more perfect action of the packing, all as hereinafter more particularly described.

Figure 1:
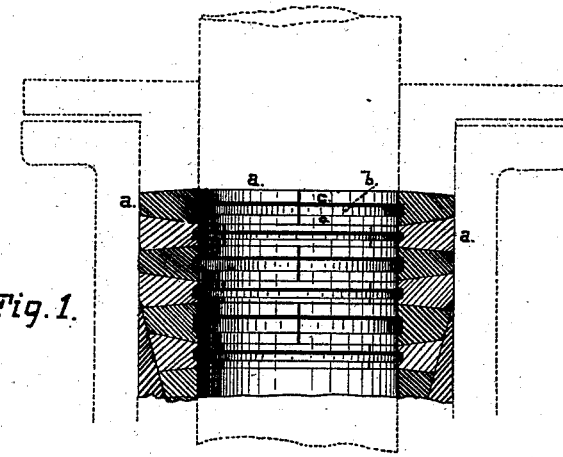
Figure 2:
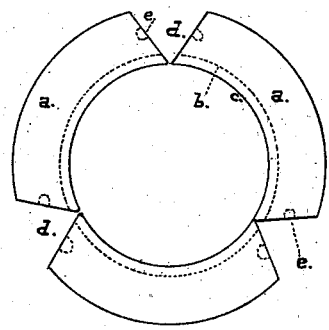
Figure 3:
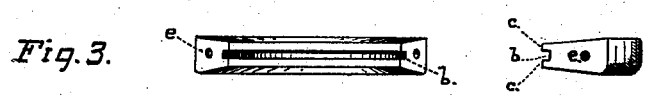

Referring to the accompanying drawings, Figure 1 is a sectional view taken vertically through several of my improved segment-rings. Fig. 2 is a top view of the segments composing the ring. Fig. 3 is an edge view of the segments.

This invention relates to an improved construction of the segmental packing-rings $a$, which are placed in layers around the piston-rod, so as to bear closely against its periphery, and prevent escape of steam during its reciprocating movements. These rings I make of the same general form as those described and set out in my former patent—that is, of wedge-shaped form and with oppositely-inclined faces, so that when several rows are laid one above another the pressure of the gland above will cause each layer to be pressed outwardly, both against the sides of the gland and around the piston-rod. I find, however, that in connection with their use some means is required for effecting and maintaining a lubrication of the inner faces of the rings and of the periphery of the piston-rod when placing and adjusting the packing for the first time, or when placing new rings in a stuffing-box, to prevent extra wear and overheating of the parts. This I accomplish by forming a groove or recess, $b$, in and along the inner face of each segment, so that when placed against the rod a channel is left between the projecting edges $c$ $c$ of the face, in which the water of condensed steam and the lubricating matter used will be caught and retained. These grooves $b$ are carried out to the edge of the segment, so that they lead into the angular space $d$, formed by the adjacent edges of any two segments and the sides of the stuffing-box, as seen in Fig. 1. This construction reduces the amount of metal in the segments that bear against the piston-rod, so that the rings, when placed first in position, are more readily adjusted in place to compensate for inequalities in the stuffing-box, and uneven wear of the rings is obviated. The accumulation of oil and water in these grooves or recesses keeps the segments cool and prevents fusion of the packing at the point where friction and heat are produced. This deposit of liquid in the several layers of segments likewise assists in preserving a tight joint all around the piston-rod for the entire depth of the packing.

In the ends of the segment-rings, and more especially in those constituting the lower layers of the packing, I provide holes or cavities $e$ $e$, for the insertion of the end of a tool when removing worn parts, as I am enabled thereby to withdraw in a much readier and more expeditious manner the segments that require to be replaced with new ones. Toward and at the bottom of the packing this operation of taking out segments is attended with more or less expense of time and labor, which my improvement entirely overcomes.

Having thus described my invention, what I claim, and desire to secure by Letters Patent, is—

1. In a sectional steam-packing, the segmental packing-rings $a$, having beveled upper and lower faces that incline in opposite directions, and provided with the concentric groove or recess $b$ in and along the inner edge or face thereof, substantially as herein described, for the purpose set forth.

2. In a sectional steam-packing, the segmental packing-rings $a$, having beveled ends and faces that incline in opposite directions, and provided with concentric grooves or recesses $b$ and the holes or cavities $e$, all constructed and arranged as and for the purpose described.

In witness whereof I have hereunto set my hand.

GEORGE CROWAN PHILLIPS.

In presence of—
EDWARD E. OSBORN,
WM. F. CLARK.